(12) United States Patent
Eatedali et al.

(10) Patent No.: US 12,151,172 B2
(45) Date of Patent: Nov. 26, 2024

(54) INDIVIDUALIZED GAME DATA AUGMENTED DISPLAYS

(71) Applicant: Activision Publishing, Inc., Santa Monica, CA (US)

(72) Inventors: Josiah Eatedali, Los Angeles, CA (US); Rob Schonfeld, Sherman Oaks, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

(21) Appl. No.: 17/395,110

(22) Filed: Aug. 5, 2021

(65) Prior Publication Data

US 2021/0362064 A1    Nov. 25, 2021

Related U.S. Application Data

(62) Division of application No. 16/128,194, filed on Sep. 11, 2018, now Pat. No. 11,090,567.

(51) Int. Cl.
    *A63F 13/825*    (2014.01)
    *A63F 13/655*    (2014.01)
    *G06T 13/40*     (2011.01)
    *G06T 19/00*     (2011.01)

(52) U.S. Cl.
    CPC .......... *A63F 13/825* (2014.09); *A63F 13/655* (2014.09); *G06T 13/40* (2013.01); *G06T 19/006* (2013.01); *A63F 2300/5553* (2013.01)

(58) Field of Classification Search
    CPC ................. A63F 13/655; A63F 13/825; A63F 2300/5553; G06T 13/40; G06T 19/006
    See application file for complete search history.

(56) References Cited

U.S. PATENT DOCUMENTS

| | | | |
|---|---|---|---|
| 7,634,731 B2 | 12/2009 | Lee | |
| 9,263,084 B1 * | 2/2016 | Amacker | H04N 21/44218 |
| 9,369,543 B2 * | 6/2016 | Murphy | H04L 67/131 |
| 9,392,212 B1 * | 7/2016 | Ross | G06T 19/20 |
| 10,198,871 B1 * | 2/2019 | Hariton | A63F 13/52 |
| 10,607,411 B1 * | 3/2020 | Pezzino | G06T 7/337 |
| 10,668,382 B2 * | 6/2020 | Khan | A63F 13/213 |
| 10,699,462 B1 * | 6/2020 | Baszucki | A63F 13/79 |
| 2002/0088853 A1 | 7/2002 | Itoh et al. | |

(Continued)

OTHER PUBLICATIONS

U.S. Appl. No. 16/128,194, filed Sep. 11, 2018, Josiah Eatedali, Rob Schonfeld, US 2020-0078689, Office Action Jul. 2, 2020 Response to Office Action Oct. 1, 2020 Final Office Action Jan. 7, 2021 Response to Final Office Action Apr. 6, 2021 Notice of Allowance Apr. 16, 2021.

*Primary Examiner* — Milap Shah
(74) *Attorney, Agent, or Firm* — RAY QUINNEY & NEBEKER P.C.; John O. Carpenter

(57) ABSTRACT

Information may be provided to smartphones to allow users to display video game characters of other individuals in a social or other setting, outside of and/or independent of game play of the video game. The smartphones may read information, for example of a badge or a face, and use the information to obtain information of a visual representation of a virtual game character of another person. The information of the game character may also be used for displays in a virtual reality game, results of which may be used to update game character status in a video game.

20 Claims, 13 Drawing Sheets

(56) References Cited

U.S. PATENT DOCUMENTS

| | | |
|---|---|---|
| 2004/0092311 A1 | 5/2004 | Weston et al. |
| 2005/0209008 A1 | 9/2005 | Shimizu et al. |
| 2005/0231473 A1 | 10/2005 | Kim et al. |
| 2006/0046803 A1* | 3/2006 | Suzuki .................. A63F 13/52 463/8 |
| 2006/0205462 A1* | 9/2006 | Bentz .................. G06Q 30/02 463/2 |
| 2006/0205464 A1* | 9/2006 | Bentz .................. A63F 13/10 463/4 |
| 2006/0258462 A1* | 11/2006 | Cheng .................. A63F 13/352 463/42 |
| 2007/0087835 A1 | 4/2007 | Van Luchene |
| 2008/0070696 A1* | 3/2008 | Kim .................. H04L 67/131 463/42 |
| 2008/0214253 A1 | 9/2008 | Gillo et al. |
| 2008/0306951 A1 | 12/2008 | Rodefer |
| 2009/0241039 A1 | 9/2009 | Estevez et al. |
| 2010/0331084 A1* | 12/2010 | Fuzell-Casey .......... A63F 13/69 463/31 |
| 2012/0088586 A1 | 4/2012 | Watkins, Jr. et al. |
| 2012/0115605 A1* | 5/2012 | Watkins, Jr. .......... A63F 13/822 463/32 |
| 2013/0079132 A1* | 3/2013 | Archer .................. A63F 13/358 463/31 |
| 2014/0085293 A1 | 3/2014 | Konoplev et al. |
| 2014/0164142 A1* | 6/2014 | Yang .................. A63F 13/60 705/14.69 |
| 2014/0250472 A1 | 9/2014 | Huang et al. |
| 2015/0018078 A1* | 1/2015 | Mallary .............. G07F 17/3255 463/25 |
| 2016/0217601 A1 | 7/2016 | Tsuda et al. |
| 2017/0080346 A1* | 3/2017 | Abbas .................. A63F 13/79 |
| 2018/0219950 A1* | 8/2018 | Hodge .................. G06F 3/012 |
| 2019/0099675 A1* | 4/2019 | Khan .................. A63F 13/212 |
| 2020/0368616 A1* | 11/2020 | Delamont .......... H04N 13/239 |

* cited by examiner

| Gameplayer ID | Visualization Data |
| --- | --- |
| Gameplayer_1 | Data Set 1 |
| Gameplayer_2 | Data Set 2 |
| Gameplayer_3 | Data Set 3 |
| ⋮ | |
| Gameplayer_N | Data Set N |

FIG. 6

INDIVIDUALIZED GAME DATA AUGMENTED DISPLAYS

CROSS-REFERENCE TO RELATED APPLICATION

This application is a divisional of U.S. patent application Ser. No. 16/128,194, filed on Sep. 11, 2018, the disclosure of which is incorporated by reference herein.

BACKGROUND OF THE INVENTION

The present invention relates generally to video games, and more particularly to displays of virtual features of a game player's video game character in association with the game player.

Video games provide a source of entertainment for many. Video games often provide an interactive activity that can be interesting and challenging, and may allow game players to control game characters engaged in simulated activities that may otherwise be unavailable. Moreover, the game characters may be fantastical in nature, and utilize personal equipment not readily available in the real world.

Some such video games also may provide for multi-player play, with potentially large numbers of game players playing the video game over a communications network. The game players, in cooperation or in competition, may engage in tasks in common, providing for interaction amongst game players who may be widely separated in space.

Unfortunately, even with multi-player play, social interaction between players generally may be limited, constricted to communications mediated by the communications network. Moreover, even if the game players were personally at the same location, the game players may not be recognizable to one another outside the context of game play, and their social interactions may be inhibited.

BRIEF SUMMARY OF THE INVENTION

Some embodiments provide a method of providing a visual display of a game character outside of game play of a video game, comprising: receiving indicia of identity of a game player by a capture device; using the indicia of identity of the game player to obtain information of appearance of a virtual character of the video game, the virtual character associated with the game player; and displaying a visual representation of the appearance of the virtual character on a display device, outside of game play of the video game.

In some embodiments, outside of gameplay, a device of a first game player receives an indicia of identity of a second game player, uses the indicia of identity of the second game player to obtain information of appearance of a virtual character associated with the second game player, and displays a visual representation of the appearance of the virtual character, outside of gameplay.

In some embodiments the indicia of identity of the second game player is information of a badge worn by the second game player. In some embodiments the information of the badge is an RFID tag. In some embodiments the information of the badge is a QR code. In some embodiments the indicia of identity is an image of the face of the second game player. In some embodiments the indicia of identity of the second game player is a video game game player ID of the second game player. In some embodiments the indicia of identity of the second game player is identification information for the second game player. In some embodiments the device of the first game player queries a server for a video game game player ID of the second game player using the identification information for the second game player. In some embodiments the server is a server associated with a conference event. In some embodiments the server is a game server.

In some embodiments a system uses the indicia of identity of the second game player to obtain information of the appearance of the virtual character associated with the second game player by: transmitting the indicia of identity of the second game player to a first server, the first server maintaining information correlating indicias of identity with game player IDs; and transmitting a game player ID received from the first server to a second server, the second server storing information of appearance of virtual characters associated with game players. In some embodiments the second server is a game server. In some embodiments the system uses the indicia of identity of the second game player to obtain information of the appearance of the virtual character associated with the second game player by transmitting the indicia of identity of the second game player to a server. In some embodiments the server storing information of appearance of virtual characters associated with game players. In some embodiments the server stores information of appearance of virtual characters correlated with indicias of identity of game players.

In some embodiments the information of appearance of the virtual character is a graphical image. In some embodiments the information of appearance of the virtual character is an animation skin.

A method for providing information outside of video game play regarding game players and video games, comprising: identifying game players in a vicinity of a smartphone, by the smartphone; transmitting a query regarding the game players to a server; receiving results of the query from the server; and displaying information indicative of the results of the query in conjunction with display of representations of the game players.

A method of using information of virtual characters of a video game during play of a virtual reality game, comprising: determining participants in the virtual reality game; requesting information from a game server regarding virtual characters, of the video game, associated with the participants in the virtual reality game; receiving information of appearance of the virtual characters of the video game; and displaying appearance of the participants in the virtual reality game using the information of appearance of the virtual characters of the video game.

These and other aspects of the invention are more fully comprehended upon review of this disclosure.

BRIEF DESCRIPTION OF THE FIGURES

FIG. 6 illustrates records of a database correlating game player IDs and data sets of information of visual representations of virtual characters in accordance with aspects of the invention.

DETAILED DESCRIPTION

Figure 1:
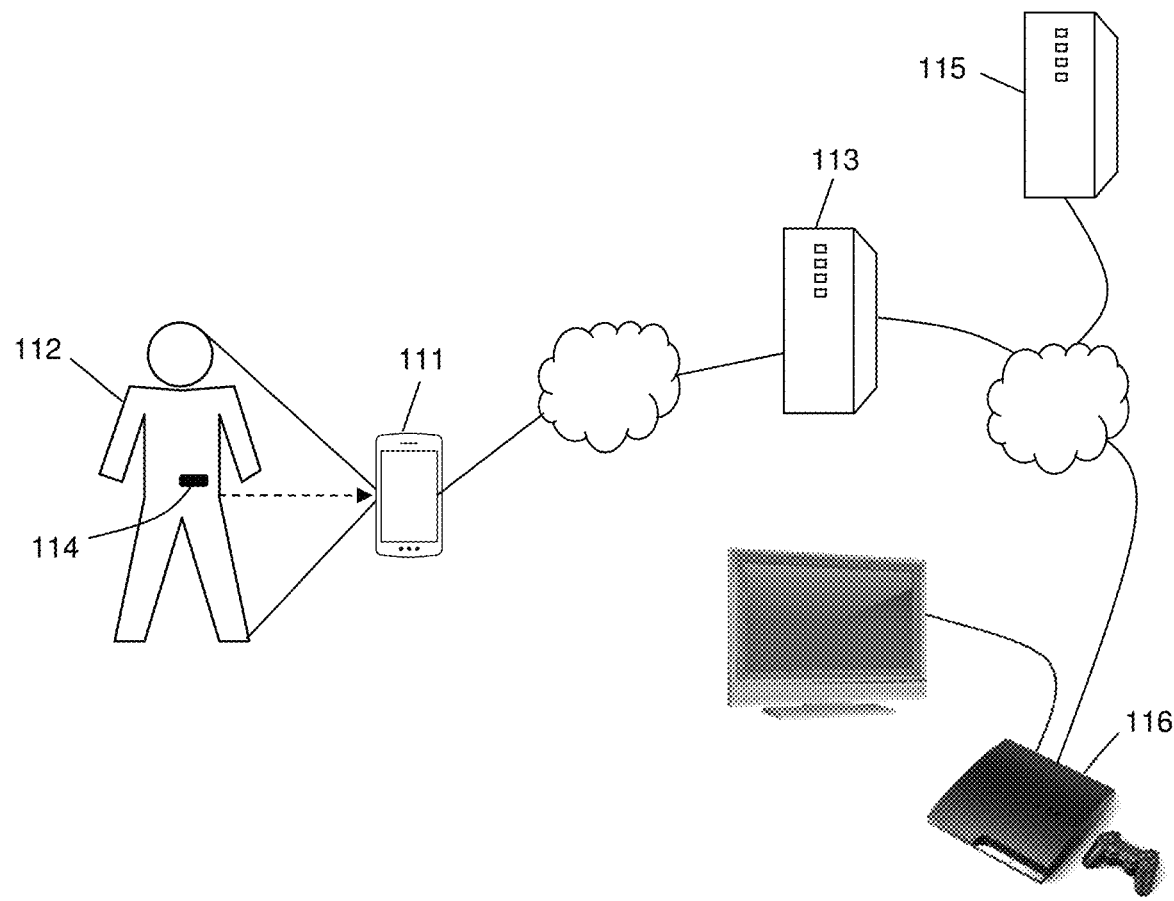
FIG. 1 illustrates a system in accordance with aspects of the invention.

FIG. 1 is a semi-block diagram illustrating aspects of embodiments of a system for providing a visual display of a virtual game character of and in association with a game player 112. In FIG. 1 a device 111 captures an image of the game player. In some embodiments the device may be considered an image capture device. The device 111 generally is or includes a camera for capturing the image. In some embodiments the device may be a stand-alone camera, which may be portable, semi-portable, or fixed in position. In some embodiments the image capture device is communicatively linked to a data communication device, for example including wireless communication circuitry or wired network interfacing circuitry. In some embodiments other circuitry may also be placed next to or near or housed with the image capture device. For example, in some embodiments, and as illustrated in FIG. 1, the image capture device may be provided by a smartphone. The smartphone may include components commonly included with smartphones, for example a camera, cellular and other wireless communication circuitry, a display, a processor, and possibly an RFID reader. In various embodiments the image capture device may be provided by some other personal networked compute device, for example a tablet computer, laptop, desktop, video game console, or some other device. For convenience, much of the following discussion will refer to the smartphone as the image capture device, and additional components as may be indicated in the discussion.

The smartphone is within communicative range of the game player, or, in some embodiments and as illustrated in FIG. 1, a wearable badge 114 or other item on the person of the game player. The badge, for example, may be a badge for a conference event, and may for example be provided by an organizer of the conference event. The badge includes indicia of identification of the game player. In some embodiments the indicia of identification is in the form of an RFID tag, with the RFID tag storing information of the indicia of identification. In some embodiments the indicia of identification is a QR code or other coded pattern printed on the badge.

The smartphone obtains the indicia of identification from the badge. For example, the smartphone may include an RFID reader, and interrogate the RFID tag of the badge to obtain the indicia of identification. Also for example, a camera of the smartphone may be used to scan the QR code or other coded pattern printed on the badge to obtain the indicia of identification. The smartphone uses the indicia of identification of the game player to obtain information of a visual representation of appearance of a virtual character associated with the game player. In some embodiments, the smartphone may use the information of the visual representation to display the visual representation of appearance of the virtual character on a display of the smartphone, for example. In other embodiments the smartphone may provide the indicia of identification, and in some embodiments an image taken by the smartphone, to a server. The server may provide the visual representation (and image in some embodiments) to a further device, for example a game console, or personal computer, or other compute device, for display on that device.

The indicia of identification for a game player is linked to the information of the visual representation of appearance of a virtual character associated with the game player. In some embodiments a server directly links different indicias of identification to different information of visual representation of appearance of virtual characters associated with different game players. In some embodiments the links between indicia of identification and information of visual representation of appearance of virtual characters may be indirect. For example, in some embodiments indicias of identification may be linked to game player IDs (which may be for example identification information used by a game server or the like to identify game players for play of a videogame), with the game player IDs linked to information of visual representations of appearance of virtual characters associated with different game players. In some embodiments, a game player may be associated with a plurality of virtual characters from one or more games and platforms. In such embodiments, the game player may specify a particular virtual character to be used in providing a visual representation. In some embodiments the particular virtual character may be indicated in the indicia of information. In some embodiments the indicia of information may indicate multiple virtual characters. In such embodiments, or in embodiments in which a server stores information regarding multiple virtual characters for a game player, alternatively, the virtual character may be selected based on other criteria, for example, the most frequently or recently used virtual character by the game player. Some of the information of the multiple virtual characters may be provided to the smartphone, and a menu may appear on the smartphone allowing the user to select the relevant virtual character, game, and/or platform.

In some embodiments in accordance with FIG. 1, the smartphone communicates the indicia of identification to a server 113. In some embodiments the server stores information of visual representations of appearance of virtual characters associated with game players in a manner such that it is linked to indicia of identification. In such embodiments the server uses the indicia of identification to determine information to provide to a display device. In some embodiments the display device is the smartphone. In some embodiments the display device is a device other than the image capture device. For example, in some embodiments the image capture device may be a fixed camera, and the display device may be a user's smartphone. Alternatively, the display device may be a remote personal computer or other compute device, for example another user's game console and associated display coupled to the Internet. In some embodiments the server 113 may be a server hosting conference information, for example. In some embodiments the server 113 may be some other server.

In some embodiments the server may provide the indicia of information to another compute device, for example another server 115 or a game console 116 of the game player, to obtain the information of visual representation of appearance of a virtual character associated with the game player. Alternatively, the server may provide some other information to the other compute device. For example, the server may store information relating indicia of identification with game player IDs. In such embodiments the server may use the indicia of information to determine a game player ID for the game player, and provide the game player ID to the other compute device. In some such embodiments the information of appearance of the virtual character may be provided to the smartphone from the other compute device by way of the server, or in some embodiments through network communications bypassing the server.

In some embodiments the information of appearance of the virtual character is an animation skin of the virtual character used by a game device in displaying the virtual character during video game play. In some embodiments the information of appearance of the virtual character associated with the game player is a graphical image. In such embodiments the smartphone may display the graphical image on the display of the smartphone. In some embodiments the graphical image may be, for example, an image of the virtual character, and may be an image of the virtual character as equipped in video game play.

Figure 2:
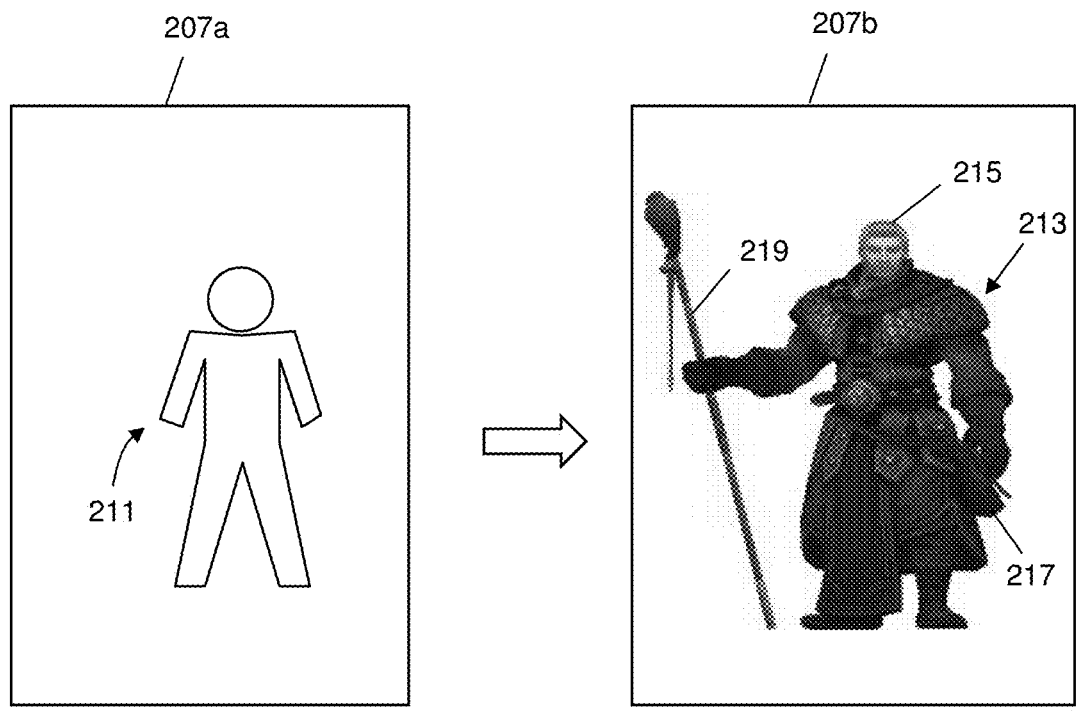
FIG. 2 illustrates displays in accordance with aspects of the invention.

In some embodiments the visual representation of appearance of the virtual character is merely an image of video game play equipment of the virtual character. In such embodiments the smartphone may display the image of equipment of the virtual character on the display of the smartphone. In some such embodiments the smartphone may display image of equipment of the virtual character as an overlay over an image of a person, for example the game player. For example, FIG. 2 illustrates displays 207a,b of a smartphone. At one time, the display 207a may show an image of a game player 211. The image may be generated, for example, using a camera of the smartphone. At a later time, the display 207b shows a composite image 213, including a face 215 of the game player and a body 217 of the virtual character associated with the game player, with the body wearing equipment of the virtual character. In addition, in some embodiments, and as illustrated in FIG. 2, the virtual character is displayed as holding further equipment 219, for example a staff. In some embodiments, the visual representation of appearance of the virtual character is displayed and animated to match the movements of the game player.

In some embodiments the indicia of identification may be an image of the face of the game player, for example as taken by a camera of the smartphone. In such embodiments the smartphone may provide the image to a server, for example the server 113 of FIG. 1, for performance of facial recognition analysis. In some embodiments the server stores images of faces of game players, and performs analysis to compare aspects of the image provided by the smartphone with aspects of the images of the faces of game players to identify a particular game player of the image provided by the smartphone. In such embodiments, it is preferable to obtain game player consent before capturing the image of the face of the game player and/or storing and processing the image.

As indicated above with respect to FIG. 1 in some embodiments, image capture devices may be other than a smartphone. Moreover, also as indicated above with respect to FIG. 1, in various embodiments devices other than image capture devices may be used to obtain, or capture the indicia of identification. In some embodiments, a capturing device may be any computing device that includes or is connected to a camera device, RFID reader, and/or other form of capture device may be used to obtain the indicia of identification. In addition, still also as indicated with respect to FIG. 1, in some embodiments, one or more additional users of the system may view an enhanced image with a visual representation of appearance of a virtual character or video captured by the smartphone or other capturing devices from their own respective viewing devices.

Figure 3:
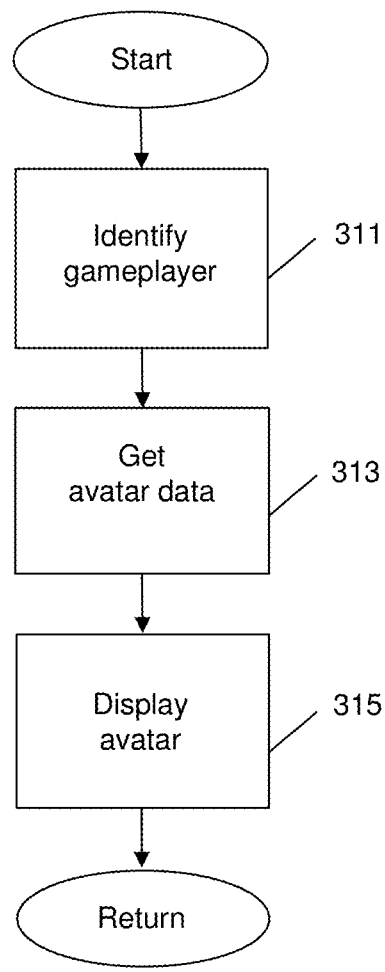
FIG. 3 is a flow diagram of a process for displaying a virtual game character associated with a game player, in accordance with aspects of the invention.

FIG. 3 is a flow diagram of a process for displaying a virtual game character associated with a game player, in accordance with aspects of the invention. In some embodiments the process is performed by the system of FIG. 1, or parts of the system of FIG. 1. In some embodiments the process is performed using a capture device, which comprise an image capture device or an image capture device and other capture device to obtain indicia of identification. In some embodiments the process is performed by a smartphone, for example the smartphone of FIG. 1. In some embodiments the process is performed by one or more processors, for example as configured by program instructions.

In block 311 the process identifies a game player. In some embodiments the process identifies the game player by using information of a badge. In some embodiments the information of the badge is information of an RFID tag of the badge. In some embodiments the information of the badge is information of printed material on the badge. In some embodiments the information of the badge is a QR code of the badge.

In some embodiments the process identifies the game player by reading information of the badge, and providing the information of the badge to a server, which stores information correlating information of the badge and information identifying game players. In some embodiments the process identifies the game player by reading information of the badge, providing the information of the badge to a server storing information correlating information of the badge with other information which may be used to identify the game player. In some such embodiments the server may transmit the other information to a further server storing information correlating the other information with information identifying game players.

In some embodiments the information of the badge is read by a capture device, which may be an image capture device or a device with near field communications capability. In some embodiments the information of the badge is read by a smartphone. In some embodiments the information of the badge is received by a near field communications device of the smartphone. In some embodiments the information of the badge is received by way of a QR code reader of the smartphone, which may be comprised of a camera of the smartphone and QR pattern recognition of the smartphone. In some embodiments the information of the badge includes information identifying the game player. In some embodiments the information of the badge is sufficient to identify the game player amongst a limited set of game players, for example game players attending a particular conference. In some embodiments the information of the badge is sufficient to identify the game player amongst a universe of all game players, with for example the information of the badge including a game player ID, which uniquely identifies a game player. In some embodiments the information of the badge is sufficient to identify an individual amongst a limited set of individuals, for example individuals attending a particular conference.

In some embodiments, in identifying the game player, the smartphone transmits the information of the badge, or some of it, to a server. In some embodiments the server the stores information correlating information of a plurality of badges and information identifying game players. In some embodiments the information identifying game players may be a game player ID, uniquely identifying a game player for the video game. In some embodiments the information identifying game players may be information identifying individuals amongst a group of individuals, for example a group of individuals attending a particular conference or event. In some such embodiments the information identifying an individual amongst the group of individuals may be sufficient to identify the game player. In some embodiments, however, the information identifying the individual amongst the group of individuals may be further used in identifying the game player. For example, in some embodiments the server stores information correlating identifications of individuals with game player IDs. In other embodiments the server may transmit the information identifying the individual to a further server, with the further server storing information correlating identifications of individuals with game player IDs.

In block 313 the process obtains information of a visual representation of appearance of a virtual character, which may be considered an avatar, associated with the game player. In most embodiments the virtual character is a character in the video game generally controlled by the game player during game play of the video game. In some embodiments the visual representation of appearance is a graphical image of the virtual character. In some embodiments the visual representation of appearance is an image of equipment of the virtual character. In some embodiments the image is suitable for use as an overlay on a display device. In some embodiments the information of visual representation of appearance of the virtual character is an animation skin, for example an animation skin used by a game device in displaying the virtual character during play of the video game.

In some embodiments the process obtains information of the visual representation of appearance of the virtual character from a server. In some embodiments the server is a server associated with an event, for example a conference. In such embodiments the server may store information correlating attendees of the event with the information of the visual representation of appearance of the virtual character. In some embodiments the server is a game server used for play of the video game, or a server associated with the game server. In such embodiments the game server, or associated server, may store information correlating game player IDs with the information of the visual representation of the appearance of the virtual character.

In some embodiments the process transmits a request for the information of the visual representation of appearance of the virtual character. In some embodiments a display device transmits the request. In some embodiments a smartphone transmits the request. In some embodiments the display device or the smartphone transmits the request to the server associated with the event, and in some embodiments the request is transmitted by the smartphone along with the information of the badge. In embodiments in which the server associated with the event stores the information of the visual representation, the server associated with the event may provide the information of the visual representation to the smartphone. In some embodiments the smartphone transmits the request to the game server, or server associated with the game server. In some embodiments the server associated with the event transmits the request to the game server, or associated server. In embodiments in which the game server or associated server stores the information of the visual representation, the game server or associated server may provide the information of the visual representation to the server associated with the event, for provision to the smartphone, or directly to the smartphone, bypassing the server associated with the event, depending on the embodiment.

In block 315 the process displays a visual representation of appearance of the virtual character. In some embodiments the visual representation is displayed or a display device. In some embodiments the display device is a personal computer or other compute device, for example a game console with associated display, which may be remote from the game player. In some embodiments the visual representation is displayed on the smartphone. In some embodiments the visual representation of appearance of the virtual character is displayed in conjunction with display of the game player, or a part of the game player. In some embodiments the display of the game player is generated based on image of the game player currently being imaged by a camera of the smartphone. In some embodiments the visual representation of appearance of the virtual character is displayed as an overlay to display of at least a portion of the image of the game player.

The process thereafter returns.

Figure 4:
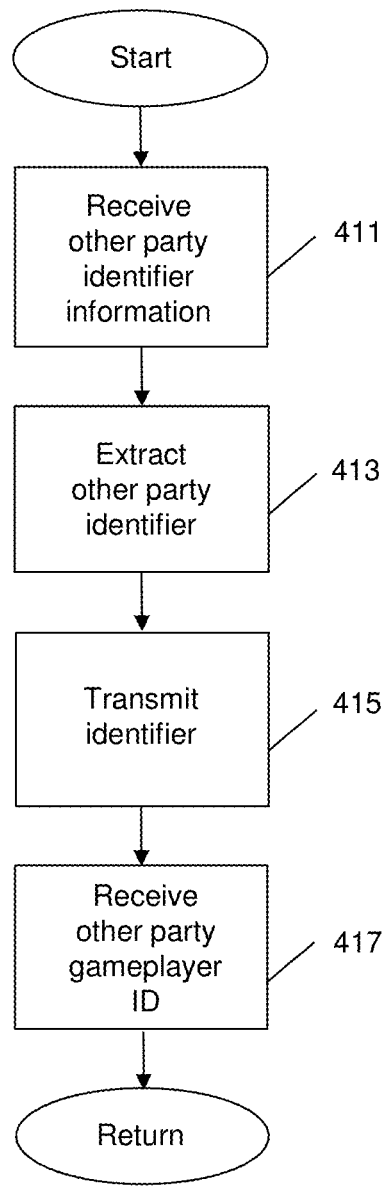
FIG. 4 is a flow diagram of a process for determining a game player ID of a game player, in accordance with aspects of the invention.

FIG. 4 is a flow diagram of a process for determining a game player ID of a game player, in accordance with aspects of the invention. In some embodiments the process is performed by the system of FIG. 1, or parts of the system of FIG. 1. In some embodiments the process is performed by a smartphone, for example the smartphone of FIG. 1. In some embodiments the process is performed by a smartphone and a server, for example the smartphone and one of the servers of FIG. 1. In some embodiments the process is performed by one or more processors, for example as configured by program instructions. In some embodiments the process is performed using or by a capture device. In some embodiments the process performs operations of block 311 of the process of FIG. 3.

In block 411 the process receives other party identifier information, with the other party for example being a game player. In some embodiments the other party identifier is received by a smartphone. In some embodiments the other party identifier information is information of a badge or clothing, for example worn by the other party. In some embodiments the information of the badge or clothing is information of an RFID tag of the badge. In some such embodiments the information of the RFID tag is received by NFC circuitry of the smartphone. In some embodiments the information of the badge is information of printed material on the badge. In some embodiments the information of the badge or clothing is a QR code of the badge or clothing, or other digital encoding on the badge or clothing. In some such embodiments the information of the printed material or the QR code is received by an image capture device, for example a camera of the smartphone.

In block 413 the process extracts an identification of the other party from the other party identifier information. In some embodiments the identification of the other party is extracted from the other party identifier information. In some embodiments the identification of the other party is extracted from a database correlating other party identifier information and identification information. In some embodiments the identification of the other party is a name. In some embodiments the identification of the other party is a numeric or alphanumeric identifier. In some embodiments the numeric or alphanumeric identifier is an identifier for a conference or other event. In some embodiments the smartphone extracts the identification of the other party. In some embodiments the other party information is extracted by a server, for example a server storing information related to an event, with the server receiving the other party identifier information, or some of it, from the smartphone.

In block 415 the process transmits the identification of the other party. In some embodiments the smartphone or other capture device transmits the identification of the other party. In some embodiments the smartphone or other capture device transmits the identification of the other party to a server storing information relating to an event, for example a conference. In some embodiments the smartphone transmits the identification of the other party to a game server for the video game, or a server associated with the game server. In some embodiments the server associated with the event transmits the identification of the other party. In some embodiments the server associated with the event transmits the identification of the other party to the game server for the video game, or the server associated with the game server.

In some embodiments the server associated with the event stores information correlating the identification of the other party with a game player ID for the other party. In such embodiments the server associated with the event may determine the game player ID for the other party. In some such embodiments the server associated with the event may provide the game player ID to the smartphone. In some such embodiments, however, the process may not utilize the operations of block 415 (or, strictly speaking, the operations of block 417 as the server associated with the event may not be considered to "receive" the other party game player ID as the server already stores information of the game player ID), as those operations may be superfluous.

In some embodiments the game server, or server associated with the game server, may store information correlating the identification of the other party with the game player ID for the other party. In such embodiments the game server, or server associated with the game server, may determine the game player ID for the other party. In some such embodiments the game server, or server associated with the game server, may provide the game player ID to the server associated with the event, or the smartphone.

In block 417 the process receives the game player ID for the other party. In some embodiments the server associated with the event receives the game player ID from the game server, or a server associated with the game server. In some embodiments the smartphone receives the game player ID, from either the server associated with the event or the game server, or a server associated with the game server.

The process thereafter returns.

Figure 5:
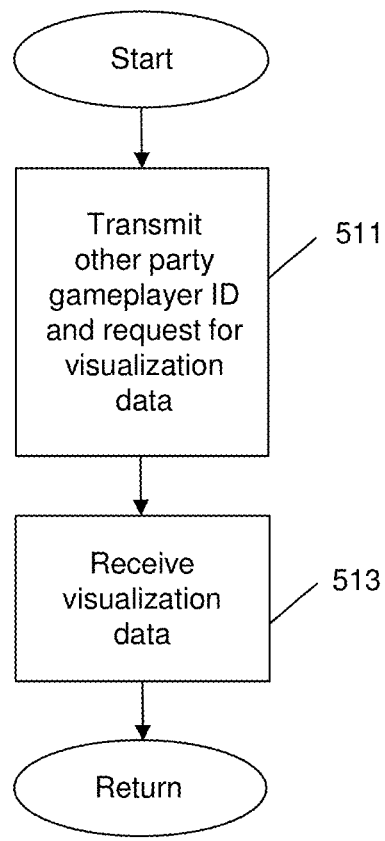
FIG. 5 is a flow diagram of a process for obtaining information of a visual representation of a virtual character associated with a game player, in accordance with aspects of the invention.

FIG. 5 is a flow diagram of a process for obtaining information of a visual representation of a virtual character associated with a game player, in accordance with aspects of the invention. In some embodiments the process is performed by the system of FIG. 1, or parts of the system of FIG. 1. In some embodiments the process is performed by a smartphone, for example the smartphone of FIG. 1. In some embodiments the process is performed by a smartphone and a server, for example the smartphone and one of the servers of FIG. 1. In some embodiments the process is performed by one or more processors, for example as configured by program instructions. In some embodiments the process is performed by a compute device, for example a personal computer or game console. In some embodiments the process performs operations of block 313 of the process of FIG. 3.

In block 511 the process transmits a request for visualization information of a game character associated with the other party. In some embodiments the request includes the game player ID of the other party. In some requests the smartphone transmits the request. In some embodiments the compute device transmits the request. In some embodiments the compute device is remote from the event. In some embodiments the smartphone transmits the request, and for convenience discussion for the remainder of FIG. 5 will be in terms of the smartphone transmitting the request, it being understood that the discussion applies equally to a remote compute device transmitting the request, and receiving a response to the request. In some embodiments the smartphone transmits the request to a server associated with the event. In some embodiments the smartphone transmits the request to a game server, or a server associated with the game server. In some embodiments the server associated with the event transmits the request. In some embodiments the server associated with the event transmits the request to the game server, or a server associated with the game server.

In some embodiments the visualization information is information of a graphical image. In some embodiments the graphical image may be, for example, an image of the virtual character, and may be an image of the virtual character as equipped in video game play. In some embodiments the visualization information is an animation skin of the virtual character used by a game device in displaying the virtual character during video game play.

In some embodiments the visualization information is stored by the server associated with the event, with the visualization information stored in association with a game player ID. In some embodiments the visualization information is stored by the game server, or a server associated with the game server, with the visualization information stored in association with a game player ID. The information may be stored in a database or other structured format, for example as indicated in FIG. 6. FIG. 6 is an example table showing records of a database correlating game player IDs and data sets of visualization information of virtual characters in accordance with aspects of the invention. The table of FIG. 6 includes game player IDs for a plurality of game players, with the table storing game player IDs for game players 1-N. The table also stores visualization information for each game player in data sets, with a Data Set 1 associated with the game player ID for game player 1, a Data Set 2 associated with the game player ID for game player 2, and so on.

In some embodiments the smartphone transmits the request to the server associated with the event. In embodiments in which the server associated with the event stores the visualization information, the server associated with the event may transmit the visualization information to the smartphone. In embodiments in which the server associated with the event does not store the visualization information, the server associated with the event may forward the request to the game server, or a server associated with the game server. The game server, or server associated with the game server, may then transmit the visualization information to the server associated with the event, for forwarding to the smartphone, or may transmit the visualization information directly to the smartphone.

In block 513 the process receives the visualization information. In some embodiments the visualization information is received by the smartphone, for use in generating a display of the game character.

The process thereafter returns.

Figure 7:
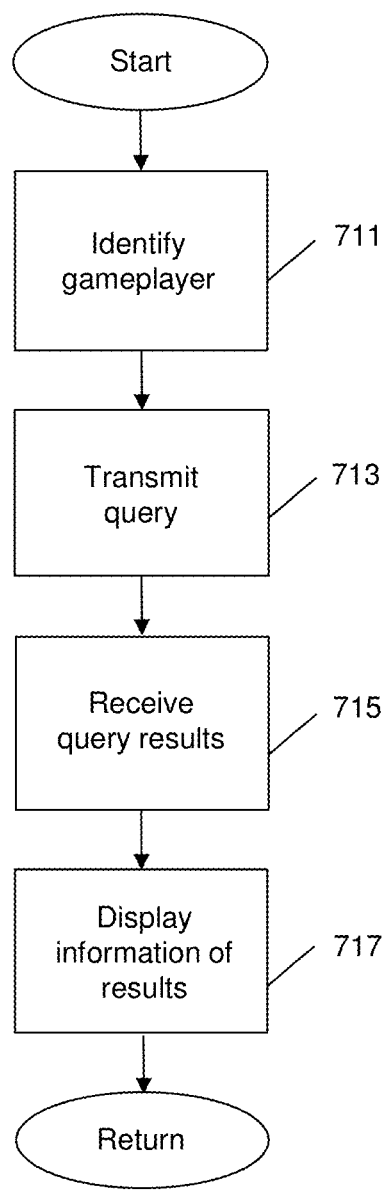
FIG. 7 is a flow diagram of a process for displaying information relating to video game play in association with a game player, in accordance with aspects of the invention.

FIG. 7 is a flow diagram of a process for displaying information relating to a video game in association with a game player, in accordance with aspects of the invention. In some embodiments the process is performed by the system of FIG. 1, or parts of the system of FIG. 1. In some embodiments the process is performed by a smartphone, for example the smartphone of FIG. 1. In some embodiments the process is performed by a smartphone and a server, for example the smartphone and one of the servers of FIG. 1. In some embodiments the process is performed by one or more processors, for example as configured by program instructions.

In block 711 the process identifies a game player. In some embodiments the process identifies the game player based on information of a badge worn by the game player. In some embodiments the process identifies a game player using facial recognition techniques. In some embodiments the process identifies the game player using a smartphone of an individual. In some embodiments the process identifies the game player as discussed with respect to block 311 of the process of FIG. 3. In some embodiments the process identifies the game player using the process of FIG. 4.

In block 713 the process transmits a query. The query relates to the video game and/or the game player. The query may request information as to status of a game character, associated with the game player, in the video game. For example, the query may request information as to whether the game character completed, achieved, or reached a particular accomplishment, for example participated in a particular raid, participated in a particular event, or attained a particular game level, and/or accumulated a particular number of desired items. In some embodiments the query may request information with respect to the game player, for example whether the game player speaks a particular language. In some embodiments the query specifies the game player and information requested of the game player and/or game character associated with the game player.

In many embodiments the query is transmitted to a server. In some embodiments the query may be transmitted by the smartphone. In some embodiments the server may be a game server, or a server associated with the game server. In such embodiments, the game server, or the server associated with the game server, may maintain a database, or other tabulation of data, storing information which may be queried. In some embodiments the query is transmitted to a server associated with an event, for example a conference, and the server associated with the event may store information which may be queried. In such embodiments the server associated with the event may be provided such information from the game server, or server associated with the game server, or the server associated with the event may receive information directly from game players.

In block 715 the process receives query results. In some embodiments the smartphone receives the query results. In some embodiments the query results are generated by the game server, or the server associated with the game server. In some embodiments the query results are generated by the server associated with the event.

Figure 8:
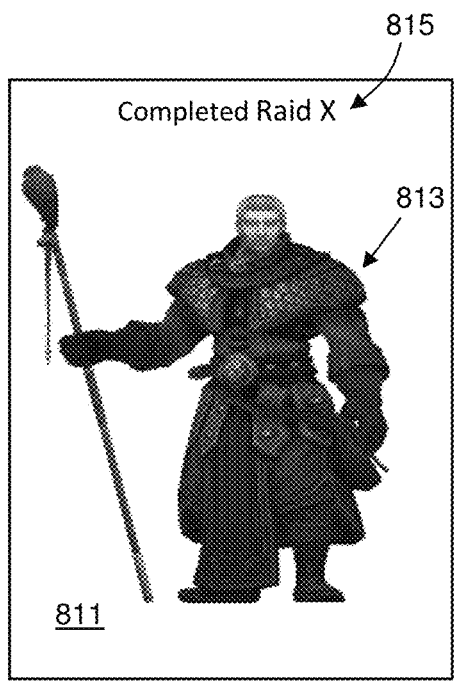
FIG. 8 illustrates a further display in accordance with aspects of the invention.

In block 717 the process displays information of the query results. In some embodiments the process displays the information of the query results on a display of the smartphone. In some embodiments the information is displayed in conjunction with an image of the game player, an image of the game character associated with the game player, or a composite image of the game player and game character. In some embodiments the image of the game player is an image generated using a camera of the smartphone or other image capture device. In some embodiments the image of the game character, or the composite image of the game player and the game character, is displayed as discussed with respect to block 315 of the process of FIG. 3. In some embodiments the information of the query results and the composite image of the game player and game character may be displayed as shown in FIG. 8. In FIG. 8, a display 811 of a display device, for example a smartphone, displays an image 813 of the game character with a head of the game player superimposed over the head of the game character. The information of the query results, namely "Completed Raid X", is displayed over the image.

The process thereafter returns.

Figure 9:
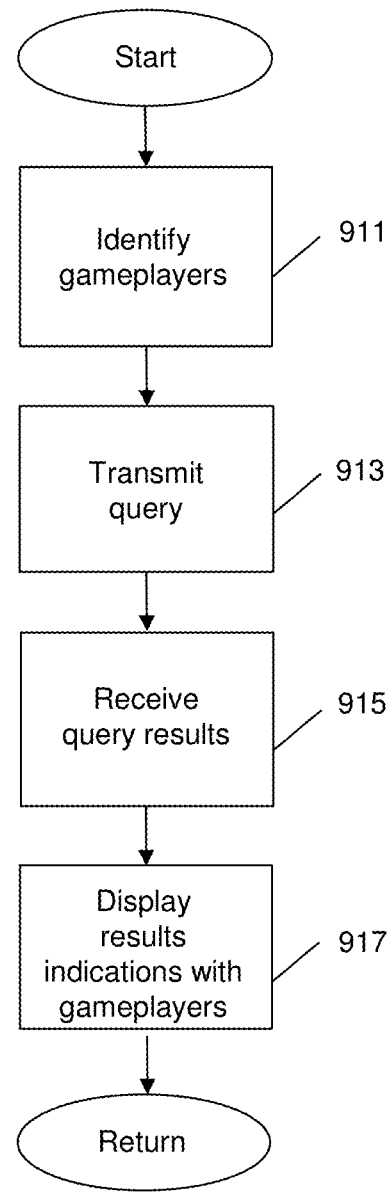
FIG. 9 is a flow diagram of a process for displaying information relating to a video game in association with multiple game players, in accordance with aspects of the invention.

FIG. 9 is a flow diagram of a process for displaying information relating to a video game in association with multiple game players, in accordance with aspects of the invention. In some embodiments the process is performed by the system of FIG. 1, or parts of the system of FIG. 1. In some embodiments the process is performed by a smartphone, for example the smartphone of FIG. 1. In some embodiments the process is performed by a smartphone and a server, for example the smartphone and one of the servers of FIG. 1. In some embodiments the process is performed by a capture device, or a capture device and a server, or a capture device, server, and display device. In some embodiments the process is performed by one or more processors, for example as configured by program instructions.

In block 911 the process identifies game players. In some embodiments the capture device, which may be the smartphone, identifies the game players. In some embodiments the smartphone identifies individual game players, for example as discussed with respect to block 311 of FIG. 3 and/or FIG. 4. In some embodiments the process also stores information of an image of each identified game player for later use. In some embodiments the information of the image is stored in memory of the smartphone, and in some embodiments the image is provided to a server for storage.

In block 913 the process transmits a query. The query relates to the video game and/or the game players. The query may request information as to status of game characters, associated with the game players, in the video game. For example, the query may request information as to whether the game characters completed a particular raid, participated in a particular event, or attained a particular game level. In some embodiments the query may request information with respect to the game players, for example whether the game players speak a particular language. In some embodiments the query specifies the identified game players, by game player ID in some embodiments, and information requested of the game players and/or game characters associated with the game players.

In many embodiments the query is transmitted to a server. In some embodiments the query may be transmitted by the smartphone. In some embodiments the query is transmitted by a display device, which may be remote from the game players. In some embodiments the server may be a game server, or a server associated with the game server. In such embodiments, the game server, or the server associated with the game server, may maintain a database, or other tabulation of data, storing information which may be queried. In some embodiments the query is transmitted to a server associated with an event, for example a conference, and the server associated with the event may store information which may be queried. In such embodiments the server associated with the event may be provided such information from the game server, or server associated with the game server, or the server associated with the event may receive information directly from game players.

In block 915 the process receives query results. In some embodiments the smartphone receives the query results. In some embodiments a display device, which may be remote from the game players, receives the query results. In some embodiments the query results are generated by the game server, or the server associated with the game server. In some embodiments the query results are generated by the server associated with the event. In some embodiments the query results indicate, for each identified game player of the query, the information requested of the game players and/or game characters associated with the game players.

In block 917 the process displays information of the query results in conjunction with images of the game players, images of the game characters associated with the game players, or composite images of the game players and game characters. In some embodiments the process displays the information of the query results in conjunction with the images on a display of the smartphone, or of the display device. In some embodiments the images of the game players is generated using a camera of the smartphone. In some embodiments the images of the game characters, or the composite images of the game players and the game characters, is displayed as discussed with respect to block 315 of the process of FIG. 3, adjusted to include multiple such images.

Figure 10:
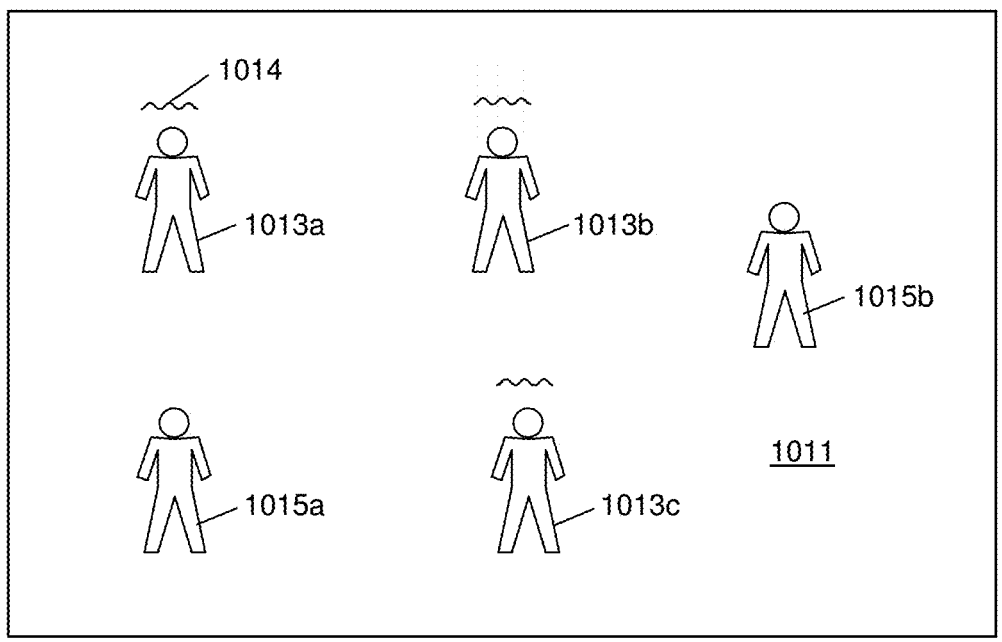
FIG. 10 illustrates a further display in accordance with aspects of the invention.

In some embodiments the information of the query results and the composite images may be displayed as shown in FIG. 10. In FIG. 10, a display 1011, for example of a smartphone or other display device displays an image showing a plurality of game players 1013a-c and 1015a,b. The image may be an image formed using a camera of the cell phone, for example or some other image capture device. For FIG. 10, text is displayed about some of the game players 1013a-c, for example text 1014 displayed above the head of game player 1013a. The text may be the information of the query results relating to that game player, for example, or may otherwise be indicative of those query results. For example, in some embodiments, the text may be that of a simple check mark, indicating a positive response to a query (e.g. "game players that speak German"). Alternatively, in some embodiments the text may be replaced by highlighting, circling, or otherwise indicating game players for which a positive query response is received. Similarly, game players 1015a,b do not have text displayed about them in the display. Such a result may occur, for example, if only positive query responses are indicated, or, in some embodiments, if no query response is received relating to those game players.

In some embodiments the smartphone or server or display device, for a display such as the display of FIG. 10, correlates game players in the image with identified game players, for use in displaying information of the query results relating to particular game players about locations of those game players in the image. In some embodiments the smartphone, server, or display device compares stored image information of identified game players with information of an image including multiple persons. Using the smartphone as an example, in some embodiments the smartphone determines portions of the image including persons, and compares colors of those images with colors of the stored image information of identified game players. In some embodiments the smartphone determines portions of the image including faces of persons, and compares information of the faces of those persons with of those images with information of faces of the stored image information of identified game players. In some embodiments the process uses facial recognition techniques or algorithms in performing the comparisons.

The process thereafter returns.

Figure 11:
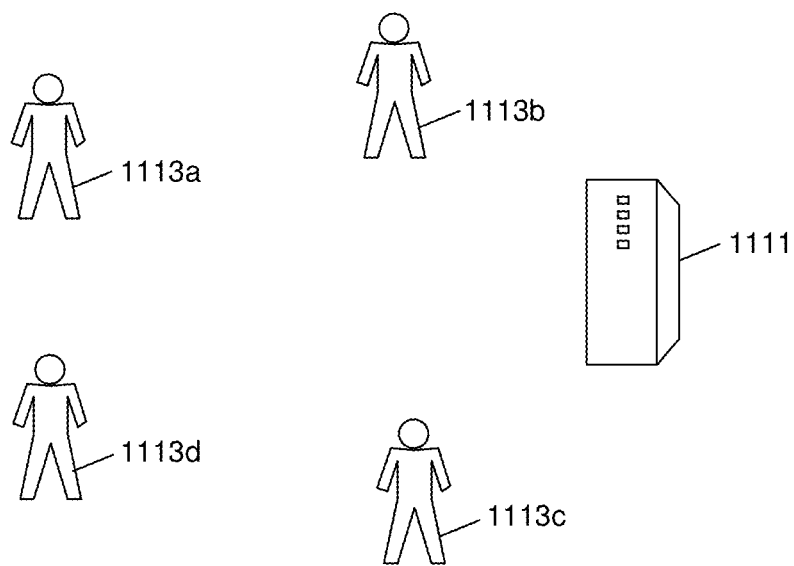
FIG. 11 is a flow diagram of a process for utilizing game device based video game play information in an augmented/virtual reality game play scenario, in accordance with aspects of the invention.

FIG. 11 illustrates portions of an augmented or virtual reality game system. For FIG. 11, a server 1111 executes program instructions to provide for game play. A plurality of individuals 1113a-d participate in the game play. In the augmented or virtual reality game system, the individuals move around a space while wearing display headsets or other display gear, with processor(s) in the headsets or elsewhere, and in some embodiments haptic or similar devices over their hands or other portions of their bodies.

During game play, the server provides information to wearable compute devices (not shown) worn by the individuals. The information includes, in various embodiments, information regarding visible objects in a virtual game world within a point-of-view of the individual, with the point-of-view indicated by sensors of the headsets, for example. The processor(s) for each individual may determine game actions taken by the individual, with movements made by the individuals in the real world correlated to movements in the virtual world. In some embodiments the virtual game world is a virtual game world of a video game.

Figure 12:
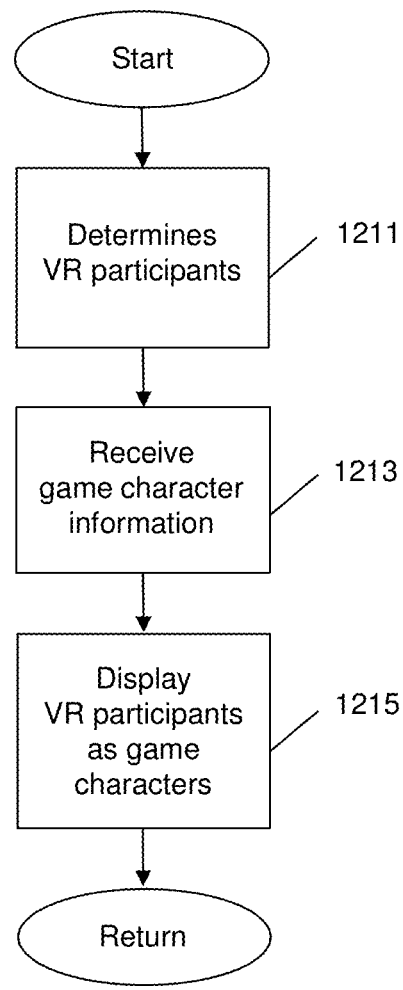
FIG. 12 is a flow diagram of a process for utilizing augmented/virtual reality based game play information in game device based video game play, in accordance with aspects of the invention.

FIG. 12 is a flow diagram of a process for utilizing game device based video game play information in an augmented/virtual reality game play scenario, in accordance with aspects of the invention. In some embodiments the process is performed by the system of FIG. 11, or parts of the system of FIG. 11. In some embodiments the process is performed by a server, for example the server of FIG. 11. In some embodiments the process is performed by a server and processor(s), for example the server and processor(s) of the servers of FIG. 11. In some embodiments the process is performed by one or more processors, for example as configured by program instructions. The process of FIG. 12 may be used, for example, to allow for players in an augmented or virtual reality game to view the other players as characters in a video game, in some embodiments characters associated with and normally controlled by the players when playing the video game.

In block 1211 the process determines identities of participants for an augmented or virtual reality game, which for convenience may be simply referred to as a VR game. In some embodiments the process determines participants in the VR game by receiving inputs from the participants, by way of entry of information onto a computer form or otherwise, indicating game player IDs of the participants. In some embodiments the process determines identities of participants as discussed with respect to operations of block 311 of FIG. 3 or the process of FIG. 4.

In various embodiments the process requests information regarding virtual characters of a video game that are associated with each participant. In some embodiments the process requests the information using game player IDs. In some embodiments the requested information includes information of visual appearance of the game characters. In some embodiments the requested information additionally includes information of powers, capabilities, levels, equipment, and/or other information regarding game play capabilities of the game characters. In various embodiments the process requests the information from a game server, or server associated with the game server.

In block 1213 the process receives the game character information. In some embodiments the server for the VR game receives the game character information from the game server, or server associated with the game server. In some embodiments the game character information includes information of appearance of the game characters, of a video game, associated with the VR game participants. In some embodiments the information of appearance of the game characters comprise animation skins for the game characters.

In block 1215 the process provides for display of the VR participants as the game characters during play of the VR game. In some embodiments the process provides the information of appearance of the game characters to processors worn by the VR participants, for display using the headsets of the VR participants. In some embodiments the server for the VR game provides the information of appearance of the game characters to the processors worn by the VR participants, for display by the headsets of the VR participants.

The process thereafter returns.

In various embodiments the process of FIG. 12 can be considered as a process for transferring virtual characters from one video game to another, different video game, for use in the other different video game. A similar process may be used to allow individuals to effectively use a virtual character from a first video game in a different context. In some embodiments the different context may be streaming of video commentary or broadcasting or the like. In such a context an individual may be identified, for example by entering a game player ID into a compute device, the game player ID may be used to obtain information of a visual representation of a virtual game character associated with the game player ID, and the visual representation of the virtual game character may be used as an overlay to or instead of an image or stream showing the individual. Similarly, various games may allow a player to be represented as an avatar in an online virtual world. In this context, an individual may be identified, for example by entering a game player ID into a compute device, the game player ID may be used to obtain information of a visual representation of a virtual game character associated with the game player ID, and the visual representation of the virtual game character may be used as an overlay to or instead of an image or stream showing the individual. Thus, the process generally discussed with respect to FIGS. 11 and 12 may also be used in other embodiments, for example, to allow video streamers or broadcasters to overlay visual representations of their virtual characters on top of their likeness during a video stream or broadcast or to allow participants in online virtual worlds (e.g., PlayStation Home or Second Life) to use their virtual characters from an external game in the online virtual world. For example, instead of monitoring results of play of a VR game, instead results of play of another game, for example taking place in an unrelated virtual world and/or an unrelated game, may be used to update game character status for play of the video game. Similarly, an exchange of items between individuals, or a gift of a virtual prize, may be used to modify game status, for example of a game character, in the video game.

Figure 13:
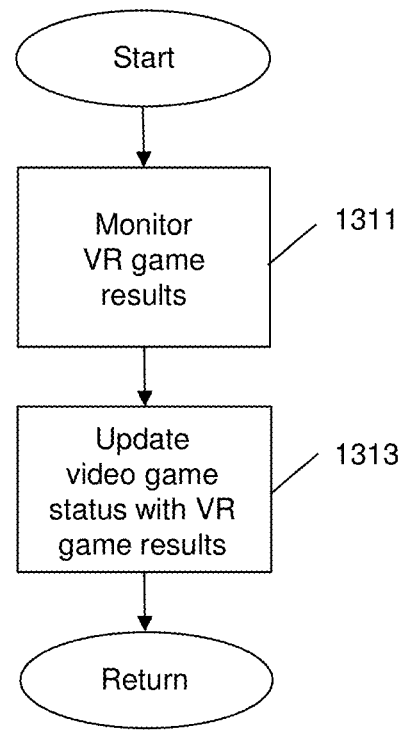
FIG. 13 is a flow diagram of a process for updating video game status with results of virtual reality game play, in accordance with aspects of the invention.

FIG. 13 is a flow diagram of a process for updating video game status with results of virtual reality game play, in accordance with aspects of the invention. In some embodiments the process is performed by a server, for example the server of FIG. 11. In some embodiments the process is performed by a server for a VR game and a game server, or server associated with the game server. In some embodiments the process is performed by one or more processors, for example as configured by program instructions. The process of FIG. 13 may be used, for example, to allow for results of play of a VR game to be used in updating game status, particularly game character status, for play of a video game. Additionally or alternatively, the aspects of the process of FIG. 13 may be used, for example, to update game status in response to events that occur outside the game, for example at a real world event or in an online virtual world.

In block 1311 the process monitors status of the VR game. In some embodiments the process monitors predetermined aspects of the VR game. For example, in some embodiments the process monitors play of the VR game, for at least one game participant, for predetermined events, for example for defeat of another character by the participant, for virtual damage to the participant, for completion of predetermined actions by the participant, and so on.

In block 1313 the process updates status of a game character in the video game based on events in the VR game. In some embodiments the server for the VR game provides the game server for the video game information indicating results of events in the VR game for use by the game server in updating character status. In some embodiments the server for the VR game provides the game server information regarding the occurrence of the predetermined events mentioned with respect to block 1311, for use by the game server in updating game character status for play in the video game.

The process thereafter returns.

Although the invention has been discussed with respect to various embodiments, it should be recognized that the invention comprises the novel and non-obvious claims supported by this disclosure.

What is claimed is:

1. A method of using information of virtual characters of a video game during play of a virtual reality game in which participants wearing display headsets move around a space, with a server providing information for display regarding visible objects in a virtual game world within a point of view of the participants, comprising:
   determining the participants in the virtual reality game;
   requesting information from a game server regarding visual representations of appearances of virtual characters, of the video game, associated with the participants in the virtual reality game;
   receiving information of visual representations of appearance of the virtual characters of the video game;
   displaying visual representations of appearance of the participants in the virtual reality game to match the visual representations of appearance of the virtual characters of the video game; and
   monitoring occurrence of predetermined events in the virtual reality game and providing information related to the occurrence of the predetermined events in the virtual reality game to the game server, for use by the game server in modifying status of the virtual characters of the video game;
   wherein the predetermined events are completion of predetermined actions by participants.

2. The method of claim 1, wherein the visual representations of appearance of the participants in the virtual reality game respectively match the visual representations of appearance of corresponding virtual characters of the video game.

3. The method of claim 1, wherein the visual representations of appearance of the virtual characters comprise graphical images of the virtual characters.

4. The method of claim 1, wherein the visual representations of appearance of the virtual characters comprise images of equipment.

5. The method of claim 1, wherein the visual representations of appearance comprise animation skins.

6. The method of claim 1, wherein determining the participants in the virtual reality game comprises:
receiving inputs from the participants.

7. The method of claim 1, wherein determining the participants in the virtual reality game comprises:
obtaining information from badges worn by the participants.

8. The method of claim 7, wherein the information is obtained from the badges via RFID tags or QR codes.

9. The method of claim 7, wherein the information is obtained from the badges using a capture device.

10. The method of claim 9, wherein the capture device comprises an image capture device or a device with near field communications capability.

11. The method of claim 1, wherein the requested information comprises:
information of visual appearance of the virtual characters of the video game; and
information regarding game play capabilities.

12. The method of claim 11, wherein the information regarding game play capabilities comprises:
information of powers, capabilities, levels, equipment, or a combination thereof.

13. A virtual reality game system, comprising:
headsets configured to display to participants as the participants move around a space; and
a server coupled with the headsets to provide information for display on the headsets during a virtual reality game, the information regarding visible objects in a virtual game world within a point of view of participants, the server configured to:
determine the participants in the virtual reality game;
request information from a game server regarding visual representations of virtual characters of a video game associated with the participants in the virtual reality game;
receive information of visual representations of appearance of the virtual characters of the video game;
provide, to the headsets, visual representations of appearance of the participants in the virtual reality game to match the visual representations of appearance of the virtual characters of the video game; and
monitor occurrence of predetermined events in the virtual reality game and provide information related to the occurrence of the predetermined events in the virtual reality game to the game server, for use by the game server in modifying status of the virtual characters of the video game, wherein the predetermined events are completion of predetermined actions by participants.

14. The virtual reality game system of claim 13, further comprising:
a capture device coupled with the server and configured to obtain information from badges worn by the participants, the information used by the server to determine the participants in the virtual reality game.

15. The virtual reality game system of claim 14, wherein the capture device comprises an image capture device or a device with near field communications capability.

16. The virtual reality game system of claim 13, wherein the visual representations of appearance of the participants in the virtual reality game respectively match the visual representations of appearance of corresponding virtual characters of the video game.

17. The virtual reality game system of claim 13, wherein the visual representations of appearance of the virtual characters comprise graphical images of the virtual characters.

18. The virtual reality game system of claim 13, wherein the visual representations of appearance of the virtual characters comprise images of equipment.

19. The virtual reality game system of claim 13, wherein the visual representations of appearance comprise animation skins.

20. The virtual reality game system of claim 13, wherein to determine the participants in the virtual reality game, the server is configured to:
receive inputs from the participants.

* * * * *